Nov. 9, 1948.  J. FLETCHER ET AL  2,453,124
PRESSURE SEALING DEVICE
Filed March 21, 1944
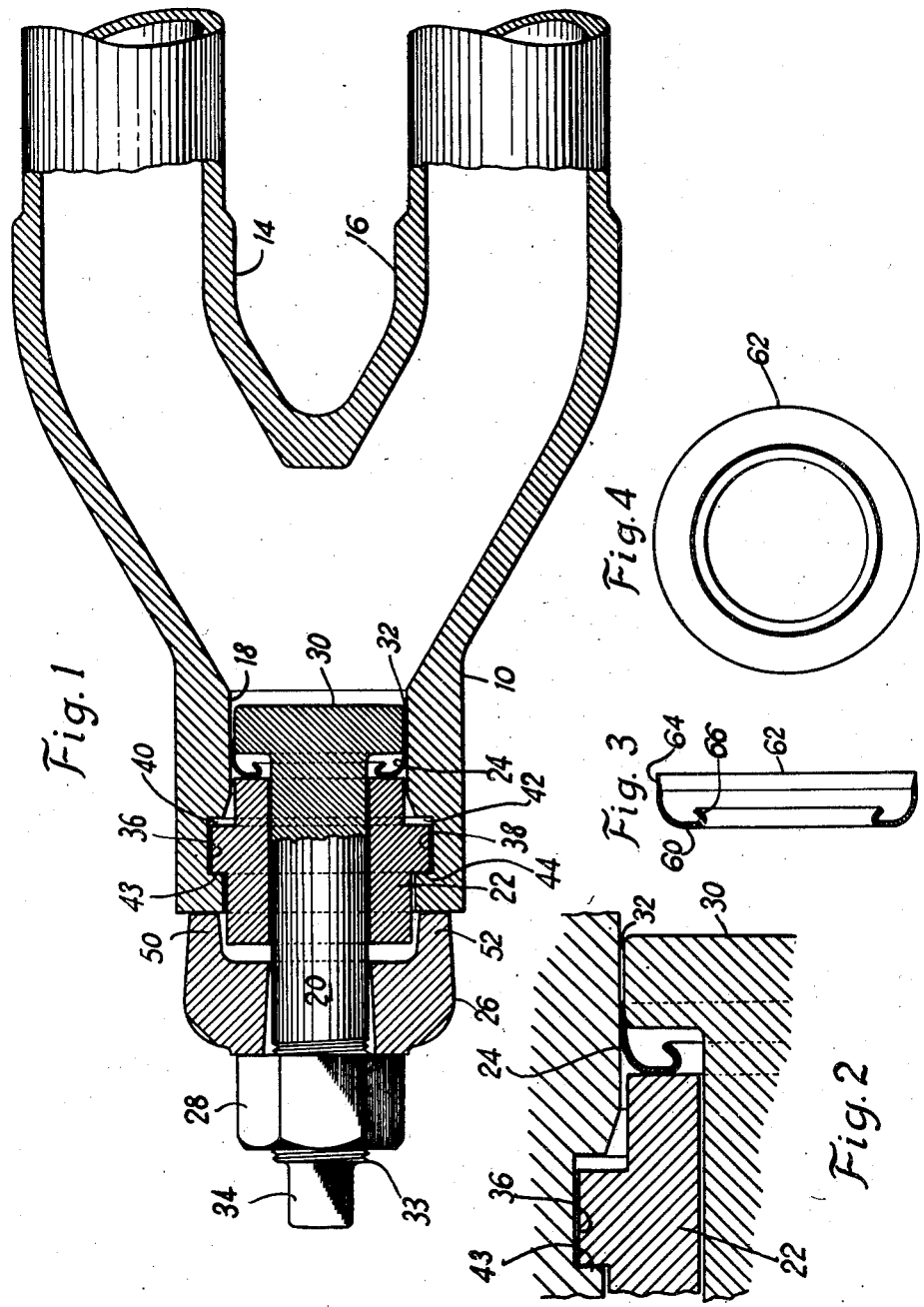
INVENTORS
James Fletcher
Ernest C. Huge
ATTORNEY Patented Nov. 9, 1948

2,453,124

UNITED STATES PATENT OFFICE 2,453,124

PRESSURE SEALING DEVICE

James Fletcher, Akron, and Ernest Carl Huge, Barberton, Ohio, assignors to The Babcock & Wilcox Company, Rockleigh, N. J., a corporation of New Jersey Application March 21, 1944, Serial No. 527,499

10 Claims. (Cl. 138—95)

1

This invention is concerned with improvements in pressure sealing devices particularly adapted for effective use with fluid heat exchange installations subject to h'gh temperatures and high fluid pressures as well as wide ranges of variation of such conditions.

An object of the invention is a durable and effective construction which will provide a reliable pressure tight seal structure including a steel gasket effective for long periods under the above indicated conditions. It is also a desideratum of the invention to provide a steel gasket which may be repeatedly removed and replaced in its operative assembly without loss of its sealing characteristics even at high pressures.

Another object of the invention is to provide a readily demountable or detachable construction which not only remains operatively effective for a long time but also facilitates maintenance access to the heat exchanger with a minimum loss of time. Other objects of the invention will appear as the accompanying description proceeds.

In the drawings:

Fig. 1 is a vertical section showing the invention as applied to a Y-fitting for an economizer; and Fig. 2 is a detailed section showing part of the Fig. 1 structure upon an enlarged scale; and Fig. 3 is a diametrical section of the metallic gasket employed in the Fig. 1 structure; and Fig. 4 is an end elevation of the metallic gasket shown in Fig. 3; and The economizer Y-fitting shown in Fig. 1 of the drawings has a tubular body 10 with tubular branches 14 and 16 communicating with a single bore, or clean-out opening 18, through which access may be had to economizer tubes integral with the branches 14 and 16. The economizer includes a plurality of such tubes connected in the illustrated manner with a number of Y-fittings, such as the ones shown, and the tubes are subject to the flow of fluid under high pressures and temperatures. Externally, the tubes are subject to high temperature furnace gases for the purpose of heating the fluid within the tubes.

For effecting efficient heat transfer under the above, and other conditions which may involve impurities in the fluid within the tubes, it is necessary that the tubes be periodically inspected for the purpose of cleaning, or other maintenance, and for this purpose, the present invention involves a readily demountable closure assembly for the bore or clean-out opening 18 of the Y-fitting. This closure assembly must, in the first place, be of such rugged construction that it can reliably

2 withstand the high pressures at which the economizers of modern steam generating installations operate. Pressures have gradually increased during recent years until pressures above 2000 p. s. i. are involved in several high capacity installations.

The closure assembly must also guard against accidental release, either partial or complete, inasmuch as any such release would cause leakage of the fluid within the economizer and might cause damage to the associated steam generator.

The illustrative closure assembly is of the type shown in the United States patent to Hamilton 2,342,140, February 22, 1944, and it includes five main parts. These are, respectively, the retainer 20, the gland structure 22, the metallic gasket 24, the binder 26, and the nut 28.

The retainer 20 has a rod-like body, one end of which is enlarged to form the closure head 30. This is adapted to be disposed within the bore 18 in the manner shown in Fig. 1, leaving a narrow annular space, or sealing opening 32, between the peripheral surface of the head 30 and the surface of the bore 18. The outer end of the retainer is formed with screw threads 33 to receive the nut 28. And beyond the screw threaded portion, there is an integral stud 34, preferably of square or hexagonal cross-section, for the application of a turning tool.

Mounted upon the rod-like portion of the retainer 20 is the gland structure having diametrically opposite radial extensions 36 and 38 normally adapted to be seated within recesses 40 and 42 within the body of the Y-fitting. Under operative conditions, the outer radial faces of these extensions are pressed against the inner radial faces of inward extensions 43 and 44 integral with the body of the Y-fitting, as shown. These extensions do not extend throughout 360°, but they leave radial openings of greater angular extent than the width of the extensions 36 and 38, so that the gland construction is associated with the Y-fitting in the specific manner indicated in detail in the disclosure of the above indicated Hamilton Patent 2,342,140.

The gland structure 22 is normally prevented from accidental turning by an axial extension of the binder 26, similar to that indicated at 44 in Figures 4 and 6 of the Hamilton patent.

The binder 26 has arms 50 and 52 resting against the end surfaces of the Y-fitting, and it is provided with an opening for assembly upon the retainer 20, as shown. As will be later referred to, the binder is held in its operative condition by abutment against the inner end of the nut 28.

The inner annular face of the gland structure is normal to the longitudinal axis of the closure assembly, and it receives the thrust of the annular flange 60 of sheet metal gasket 62. The gasket, beyond this flange, is preferably of conoidal formation, presenting an outer flange 62, which is formed with a wedge-shaped rim portion 64. This rim portion is adapted to be forcibly seated within the annular sealing space 32 by the axial reaction of the inner face of the gland structure against the gasket 60, and the latter is additionally strengthened by the flange 66, which is out-turned, as indicated.

The thrust which causes the outer flange 62 of the gasket to effect a pressure-tight seal between the retainer head 30 and the bore 18 is caused by the turning of the nut 28 so as to move the gland head outwardly, or to the left, in Figures 1 and 2.

Although the outer flange of the gasket 62 is of relatively light wall construction, the gasket is strong enough to force the wedge-shaped marginal portion 64 into tight engagement with the peripheral edge of the head 30 and the wall of the bore 18, and yet, the gasket flange is light enough (or thin enough) to allow plastic flow within the wall in order to permit the gasket to accommodate itself to slight irregularities in the surface of the head 30 or the surface of the bore 18. If the wall section of the outer gasket flange were extremely heavy, the load on its wedge-edged marginal portion 64 would be heaviest, and would produce more deformation at the point where the wedge is tightest, before the wedge is forced into tight position, or 100% contact area. With the illustrative light wall construction on the tight spots making first contact, there will be some plastic flow in the wall of the gasket over this area until the pressure becomes equalized over all of the contact area.

In an illustrative embodiment of the gasket for a 1⅜" bore opening, the outside diameter is 1.374". It has a wall thickness of 1/32" and the outside rim or flange has a 1/16" taper. Its dimension along its longitudinal axis is ¼". The inner flange is thicker than the mean thickness of the rim and it is turned back to form a quasi-toroidal surface to stiffen the base of the gasket so that adequate pressure may be exerted to effect a pressuretight closure even at high pressures (13,000 p. s. i., or greater) when there is considerable plastic flow externally of the base, or inner flange. In the above indicated embodiment, and with the employment of steel, die forged and heat treated after forging, the wall thickness of the metal is about 1/44 of the outside diameter.

The illustrative closure assembly has retained its pressuretightness throughout a test of 100 cycle duration, although a fibrous gasket has resulted in bad leaks on a test of 39 cycle duration, the cycles involving changes in temperature from 100° F. to 400° F. Tests have indicated that the illustrative gaskets also form perfectly tight seals at all pressures up to 18,000 p. s. i., the yield point of the gasket being of the order of 13,000 to 15,000 p. s. i. In one test, the gasket was considerably reduced in height (approximately 50%) at 17,000 p. s. i., but it did not lose its holding properties. The gasket is preferably made of annealed soft steel having a tensile strength of 60,000 p. s. i., or greater, and is die-forged from sheet metal.

The degree of compression of the illustrative gasket, caused by the tightening of the nut 28 is increased as operating pressures increase. Plastic flow in the rim shows a marked increase as the pressure rises from 5000 p. s. i. to 16,000 p. s. i., and the innermost flange (curved back portion) is flattened against the intermediate portion or annular flange 60 at the latter pressure.

What is claimed is:

1. In an economizer access fitting, a metallic body normally containing a fluid at high temperature and pressure and presenting an access bore or opening at one side, an easily detachable gland structure normally fixed within said opening, a retainer easily slidable into a bore in the gland structure and having at its inner end an enlarged head disposed within said access bore or opening so as to present a narrow annular sealing opening between the periphery of the head and the wall of the access opening, and a metallic gasket of conoidal shape and having a rim portion normally axially forced into said sealing opening and into pressuretight contact with the peripheral portion of said head and the wall of said access opening.

2. In combination: an economizer Y-fitting normally containing a fluid at high pressures and temperatures and formed with an access opening; and readily demountable means normally effecting a durable pressure tight closure for said opening over wide ranges of temperature and pressure variations; said means including a metallic retainer member having a head normally extending into said opening and forming with the wall of the opening a narrow annular sealing opening, a gland member having a bore receiving an extension of said retainer member and normally held in fixed relation to said fitting, and a thin pressuretight steel gasket of conoidal construction and formed with a wedge-shaped rim portion normally disposed in said sealing-opening and axially forced into contact with the edge of said head and the surfaces of said fitting defining said sealing-opening, said gasket also having a radial intermediate flange at its small end normally arranged in abutting relation to the end of said gland member to receive the pressure sealing thrust thereof.

3. In an economizer access Y-fitting construction; a metal body member having an opening; a retainer having a head normally detachably held within said opening so as to form a narrow annular sealing opening; and easily detachable metallic means carried by said retainer for effecting a pressuretight joint between said retainer and said body member, said means including a normally fixed gland constituting a thrust member relative to which said head is axially adjustable, and a conoidal sheet metal gasket having a radial intermediate flange at its small end for receiving sealing reaction from said thrust member, said gasket having a wedge-shaped rim portion normally axially forced into said sealing opening and into pressuretight sealing contact with the peripheral surface of said head and the wall of said opening by an axial thrust against said radial flange caused by the movement of said head toward the thrust member.

4. In combination; a steel pressure part adapted as a part of a heat exchanger to contain a fluid at high temperatures and pressures and formed with an opening; and readily demountable means normally effecting a durable pressuretight closure for said opening over wide ranges of temperature and pressure variations; said means including a steel body extending through said opening with an easily sliding fit, a member disposed around said body and adjustable longitudinally thereof, and a thin pressure-tight sealing member constructed of sheet metal and of conoidal construction formed with a wedge-shaped rim portion normally axially forced into contact with the edge of said body and the surfaces of said pressure part defining said opening, said sealing member also having a radial intermediate flange at its small end normally arranged in abutting relation to said adjustable member to receive the pressure sealing thrust thereof.

5. In combination; a pressure part adapted as a part of a heat exchanger to contain a fluid subject to high temperatures and formed with an opening; and readily demountable means normally effecting a durable pressure tight closure for said opening over wide ranges of temperature, and pressure variations; said means including a metallic body extending through said opening with an easily sliding fit, a member disposed around an extension of said metallic body and adjustable longitudinally thereof, and a thin pressuretight sealing member of conoidal construction with its rim portion normally axially forced into contact with the edge of said body and the surfaces of said pressure part defining said opening, said sealing member also having a radial intermediate flange at its small end normally arranged in abutting relation to said adjustable member to receive the pressure sealing thrust thereof.

6. In an economizer access fitting construction; a metal body member having an opening; a gland construction having a part normally detachably held within said opening with an easy sliding fit; and easily detachable metallic means carried by said gland construction for effecting a pressuretight joint between said part and said body member, said means including a normally fixed thrust member relative to which said part is axially adjustable, and a sheet steel gasket formed with a conically surfaced outer rim and having a radial intermediate flange at its small end for receiving sealing reaction from said thrust member, the rim portion of said gasket being forced into pressuretight sealing contact with the periphery of said part and the wall of said opening by an axial thrust against said radial flange caused by the movement of said part towards the thrust member.

7. In an economizer access fitting, a metallic Y-body normally containing a fluid at high temperature and pressure and presenting an access bore or opening at one side, an easily detachable gland structure normally fixed within said opening and having a bore therethrough, a retainer easily slidable into the bore in the gland structure and having at its inner end an enlarged head disposed within said access bore or opening so as to present a narrow annular fissure-like sealing opening between the periphery of the head and the wall of the access opening, and a die-forged sheet metal gasket of conoidal shape and having a wedge-shaped rim portion normally axially forced into said sealing opening and into pressuretight contact with the peripheral portion of said head and the wall of said access opening, said gasket being formed with an inwardly extending intermediate radial flange at its small end for re-enforcing that part of the gasket so that it may adequately transmit the thrust required to cause the wedge-shaped rim portion to form a pressuretight seal at the sealing opening.

8. A gasket of thin sheet steel consisting of an elastic resilient ring in the form of a frustum of a conoidal funnel with its larger diameter or portion having a completely circular edge or rim of tapering wall thickness to enter and seal a thin pressure crevice with a wedging sealing action.

9. A gasket of thin sheet steel consisting of an elastic resilient ring in the form of a frustum of a conoidal funnel with its larger diameter or portion having a completely circular edge or rim of tapering wall thickness to enter and seal a thin pressure crevice with a wedging sealing action, and having at its smaller diameter portion an integral annular flange disposed in a plane transverse to the longitudinal axis of the conoidal ring.

10. A gasket of light gauge sheet steel having a radially outer part constructed in the form of a frustum of a circular and conical funnel with its larger diameter edge or rim completely circular and of tapering wall thickness to enter and seal a pressure crevice with a wedging sealing action, an intermediate flange forming an annular base portion with its flat surface in a plane or zone disposed generally normal to the longitudinal axis of the conoidal outer part, and an inner flange at the small diameter edge of the intermediate flange, said inner flange being curved axially and outwardly so as to form with the intermediate flange a channeled rigidifying annulus with the channel opening radially outwardly.

JAMES FLETCHER.
ERNEST CARL HUGE.

REFERENCES CITED

The following references are of record in the file of this patent:

UNITED STATES PATENTS

| Number | Name | Date |
|---|---|---|
| 179,947 | O'Neill | July 18, 1876 |
| 519,805 | Bavier | May 15, 1894 |
| 864,135 | Mezger | Aug. 20, 1907 |
| 1,137,955 | Dies | May 4, 1915 |
| 1,156,799 | Meaker | Oct. 12, 1915 |
| 1,187,562 | Stranahan | June 20, 1916 |
| 1,685,059 | Bailey | Sept. 18, 1928 |
| 2,036,520 | Fitzgerald | Apr. 7, 1936 |